J. WHITE.
SHOVEL.
No. 10,244. Patented Nov. 15, 1853.
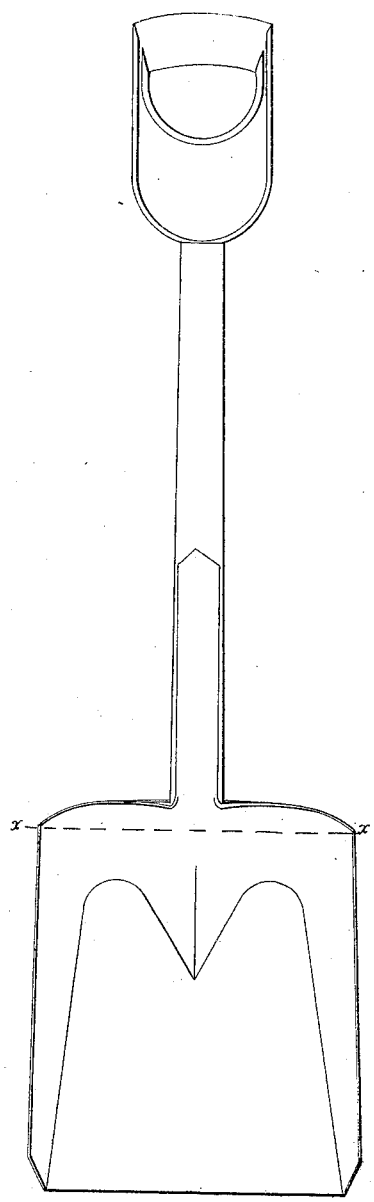
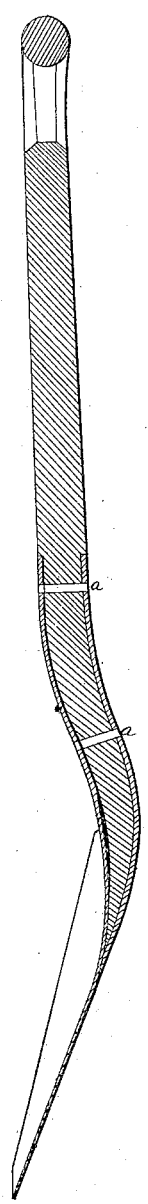
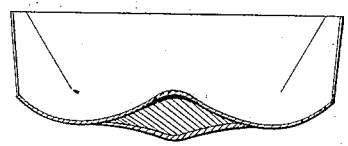
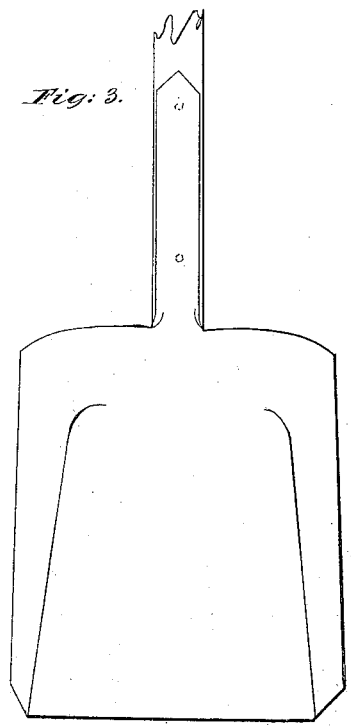

UNITED STATES PATENT OFFICE.

JONATHAN WHITE, OF ANTRIM, NEW HAMPSHIRE.

IMPROVEMENT IN UNITING SHOVEL-BLADES TO THE HANDLE-STRAPS.

Specification forming part of Letters Patent No. 10,244, dated November 15, 1853.

*To all whom it may concern:*

Be it known that I, JONATHAN WHITE, of Antrim, in the county of Hillsborough and State of New Hampshire, have invented an Improved Shovel; and I do hereby declare that the following description, with the accompanying drawings, forms a full, clear, and exact specification thereof.—

My improved shovel is characterized by having the iron straps to receive the handle welded to the sheet cast-steel blade, instead of their being riveted together, as heretofore.

In the drawings, Figure 1 represents a front or top view of my improved shovel. Fig. 2 represents a longitudinal vertical section. Fig. 3 represents a detail back or bottom view, and Fig. 4 represents a horizontal section taken in the plane of the line x x, Fig. 1.

a a, Fig. 2, are rivets. The parts colored blue represent the iron straps, as seen in the several figures.

I construct my shovel in the following manner: I cut the shovel-blade of the required size and shape out of a piece of sheet cast-steel, flat, and I prepare in the usual way two iron handle-straps of the same form as in riveted shovels. I then weld by blows or pressure the top strap onto the bottom side of the cast-steel blade or plate in the proper position. I then weld in the same way the bottom strap covering the top strap onto the same bottom side of the blade by placing them on a die, which bears on the outer part of the flaring end of the strap as cut into shape, leaving the socket or eye for the handle unwelded.

The proper welding-heat can be best applied by using my improved furnace for welding iron shanks to cast-steel tools, patented October 14, 1851; but it can be applied also in the case of shovels by using a common blacksmith's fire, or any furnace which will apply the heat to the parts to be welded, while the rest of the shovel-blade is not so much exposed to the welding-heat as to be injured by it. After the two straps are thus welded to the blade I then insert between them the eye or "socket pin," as I call it, and put the shovel into the swage and press it into shape. I then grind and polish the shovel, and then withdraw the eye-pin and put in the handle and rivet it through the straps with two rivets, and finish the whole in the usual way. The welding makes a stronger fastening of the straps to the blade than can be made by rivets, and less liable to break, and not liable to become loose; and shovels so made admit of a perfect finish, being entirely smooth on both sides, and are not liable to any clogging in the use of them.

I claim—

The uniting by welding of the iron handle-straps to the sheet cast-steel blade, in the manner substantially as herein set forth.

JONATHAN WHITE.

Witnesses:
 CHAS. MCKEAN,
 GEO. C. DUNCAN.